(12) United States Patent
Lin et al.

(10) Patent No.: US 11,650,420 B2
(45) Date of Patent: May 16, 2023

(54) HEAD-UP DISPLAY

(71) Applicants: LITE-ON ELECTRONICS (GUANGZHOU) LIMITED, Guangzhou (CN); LITE-ON TECHNOLOGY CORPORATION, Taipei (TW)

(72) Inventors: Yu-Chih Lin, Taipei (TW); Ming-Ping Lai, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 310 days.

(21) Appl. No.: 16/950,700

(22) Filed: Nov. 17, 2020

(65) Prior Publication Data

US 2021/0294100 A1    Sep. 23, 2021

(30) Foreign Application Priority Data

Mar. 17, 2020    (CN) .......................... 202010185041.8

(51) Int. Cl.
*G02B 27/01*    (2006.01)
*G02B 27/28*    (2006.01)
*G02B 5/30*    (2006.01)

(52) U.S. Cl.
CPC ....... *G02B 27/0103* (2013.01); *G02B 5/3025* (2013.01); *G02B 5/3083* (2013.01);
(Continued)

(58) Field of Classification Search
CPC .. G02B 27/0103; G02B 27/283; G02B 27/01; G02B 27/0101; G02B 5/3025;
(Continued)

(56) References Cited

U.S. PATENT DOCUMENTS

| 6,525,847 B2 | 2/2003 | Popovich et al. |
| 10,310,261 B2 | 6/2019 | Christmas et al. |

(Continued)

FOREIGN PATENT DOCUMENTS

| CN | 106896506 A | 6/2017 |
| CN | 107422477 A | 12/2017 |

OTHER PUBLICATIONS

Kim et al., CN 107422477 A, published May 22, 2017, English language machine translation generated 11/17/20222 (Year: 2017).*

(Continued)

*Primary Examiner* — Stephone B Allen
*Assistant Examiner* — Adam W Booher
(74) *Attorney, Agent, or Firm* — Innovation Counsel LLP

(57) ABSTRACT

A head-up display including a light source module, a spatial light modulator, an imaging screen group and a control unit is provided. The light source module is configured to project a light beam. The spatial light modulator is configured to modulate the light beam as a first image and a second image and project respective image lights of the first and second images. The imaging screen group is configured to reflect the image lights of the first and second images to the visible range of the user, such that the user can view the first and second images. The control unit is coupled to the spatial light modulator to input at least two modulation signals to control the beam-splitting mechanism of the spatial light modulator.

5 Claims, 4 Drawing Sheets

(52) U.S. Cl.
CPC ...... *G02B 27/283* (2013.01); *G02B 2027/014* (2013.01); *G02B 2027/0109* (2013.01)

(58) Field of Classification Search
CPC .......... G02B 5/3083; G02B 5/30; G02B 5/32; G02B 2027/0109; G02B 2027/014; G02B 2027/0105; G02B 2027/0107; G02B 2027/0174; G02F 2203/12; G02F 1/13; G02F 1/1313; G02F 1/1323
See application file for complete search history.

(56) References Cited

U.S. PATENT DOCUMENTS

2018/0314065 A1* 11/2018 Li ........................ B60K 35/00
2019/0041635 A1  2/2019 Chauveau

OTHER PUBLICATIONS

Chinese Office Action corresponding to Application No. 202010185041.8 and dated Jul. 4, 2022, 8 pages.

* cited by examiner

HEAD-UP DISPLAY

This application claims the benefit of People's Republic of China application Serial No. 202010185041.8, filed Mar. 17, 2020, the subject matter of which is incorporated herein by reference.

BACKGROUND OF THE INVENTION

Field of the Invention

The invention relates in general to a head-up display with multiplexing beam-splitting mechanism for concurrently displaying different images at different imaging positions.

Description of the Related Art

The head-up display (HUD) is configured to display driving information (such as vehicle speed, fuel level, and navigation information) within a visible range in front of the driver's eyes, such that the driver can concurrently view the images projected from the display and the traffic state in front of the vehicle.

To achieve an object of three-dimensional image display, the conventional head-up display use image generation modules to display two images at different imaging positions but will incur a higher cost. The other conventional head-up display can adjust the focal length using an adjustable lens to adjust the imaging position of a virtual image. However, the virtual image is generated at single distance at one time but cannot display two images at different imaging positions at the same time.

SUMMARY OF THE INVENTION

The invention is directed to a head-up display, which can concurrently display different images at different imaging positions using a spatial light modulator with multiplexing beam-splitting mechanism.

According to one embodiment of the present invention, a head-up display, including a light source module, a spatial light modulator, an imaging screen group and a control unit, is provided. The light source module is configured to project a light beam. The spatial light modulator is configured to modulate the light beam as a first image and a second image and project respective image lights of the first and second images. The imaging screen group is configured to reflect the image lights of the first and second images to the visible range of the user, such that the user can view the first and second images. The control unit is coupled to the spatial light modulator to input at least two modulation signals to control the beam-splitting mechanism of the spatial light modulator.

According to another embodiment of the present invention, a head-up display, including a light source module, a spatial light modulator, an imaging screen group and a beam-splitting element, is provided. The light source module is configured to project a light beam. The spatial light modulator is configured to modulate the light beam as a first image and a second image and project respective image lights of the first and second images. The imaging screen group is configured to reflect the image lights of the first and second images to the visible range of the user, such that the user can view the first and second images. The beam-splitting element is disposed between the spatial light modulator and the imaging screen group to split the light beam into a transmitted light beam and a reflective light beam. The transmitted light beam forms the first image, and the reflective light beam forms the second image.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
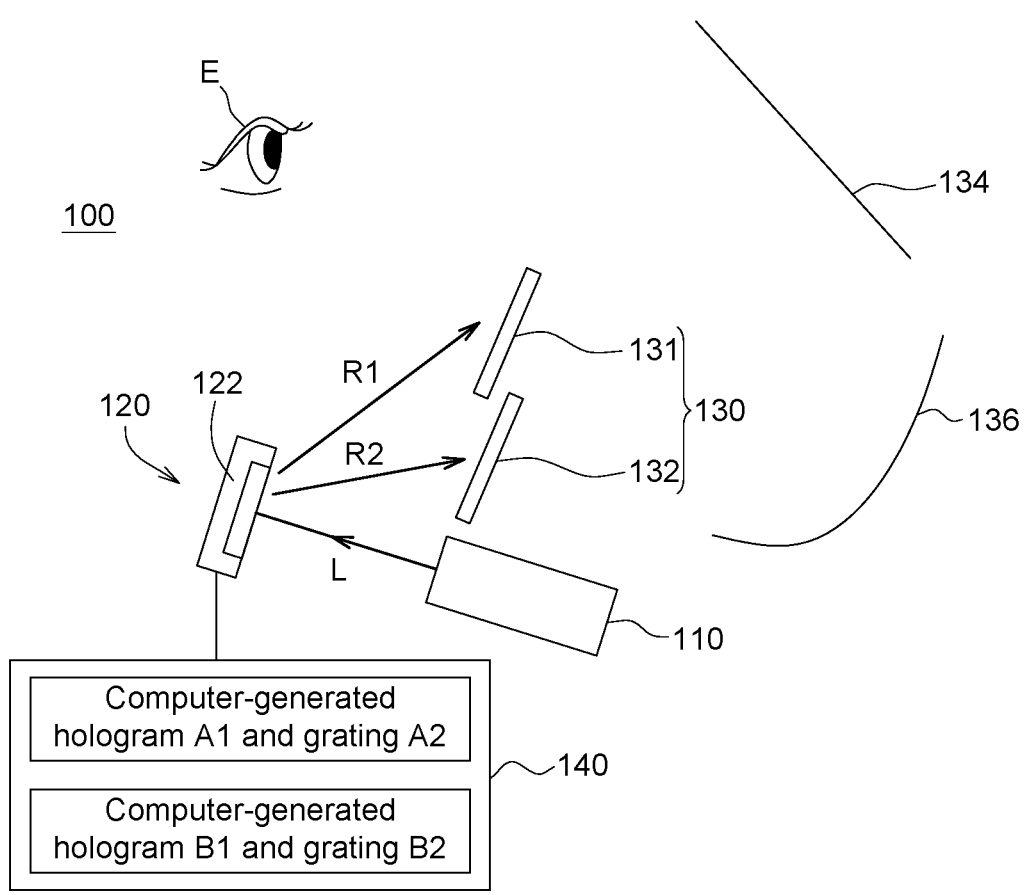
FIG. 1 is a schematic diagram of a head-up display according to an embodiment of the present invention.

Detailed descriptions of the invention are disclosed below with a number of embodiments. However, the disclosed embodiments are for explanatory and exemplary purposes only, not for limiting the scope of protection of the invention. Similar/identical designations are used to indicate similar/identical elements. Directional terms such as above, under, left, right, front or back are used in the following embodiments to indicate the directions of the accompanying drawings, not for limiting the present invention.

According to an embodiment of the present invention, a head-up display with multiplexing beam-splitting mechanism is provided. The head-up display of the present invention is used in the vehicle to achieve an object of two-dimensional or three-dimensional display. The head-up display of the present invention, provided with only one light source module, performs multiplexing beam splitting on single light beam using a spatial light modulator to concurrently display different images at different imaging positions. Thus, the head-up display of the present invention does not require several image generation modules and therefore can save cost. Besides, since two-dimensional image does not contain depth information, the three-dimensional image cannot be re-constructed. The head-up display of the present invention achieves an object of three-dimensional display by concurrently displaying different images at different imaging positions at different angles and distances using an angular multiplexing beam splitting mechanism or a polarization multiplexing beam-splitting mechanism.

In an embodiment, the spatial light modulator modulates the light beam using a diffraction optical element, such as a liquid crystal display element, or computer-generated holograms (CGH), wherein the liquid crystal display element, which can be formed by a transmissive liquid crystal or a liquid crystal on silicon (LCoS) spatial light modulator, for example, applies a voltage to control the inclination angle of the liquid crystal molecules and modulate the amplitude and phase of the incident light beam to adjust the polarization state or polarization angle of the incident light beam. In an embodiment, the control unit inputs two computer-generated holograms to respective display areas of the liquid crystal display element at a suitable angle in the form of parallel light beams. The light beam forms an image through optical Fourier transform to re-construct a light field of the target image on the Fourier plane. Therefore, as long as the distance between the imaging screen group and the two computer-generated holograms meet the condition of far field diffraction, the two re-constructed images can respectively be displayed on the imaging screen group.

In an embodiment, the head-up display with multiplexing beam-splitting mechanism displays the first and second images on the reflective screen for the user to view or displays the first and second images at different imaging positions outside the transparent screen (such as a wind screen), such that the driver can concurrently view the images projected from the display and the traffic state in front of the vehicle to realize augmented reality.

Referring to FIG. 1, a schematic diagram of a head-up display 100 according to an embodiment of the present invention is shown. The head-up display 100 includes a light source module 110, a spatial light modulator 120, an imaging screen group 130 and a control unit 140. The light source module 110 is configured to project a light beam L. The spatial light modulator 120 is configured to modulate the light beam L as a first image and a second image and project respective image lights R1 and R2 of the first and second images. The imaging screen group 130 is configured to reflect the image lights R1 and R2 of the first and second images to the visible range of the user's eye E, such that the user can view the first and second images or respective virtual parts of the first and second images. The control unit 140 is coupled to the spatial light modulator 120 to input at least two modulation signals to control the beam-splitting mechanism of the spatial light modulator 120.

The light source module 110, which can be an optical machine module, a laser light source or a light-emitting diode (LED) light source, projects a light beam L, such as a parallel light or a spherical wave, to the spatial light modulator 120. The light beam L is modulated by the spatial light modulator 120 as a first image and a second image and forms images. The image lights R1 and R2 of the first and second images are further projected on the imaging screen group 130 by the spatial light modulator 120 for the user to view.

The spatial light modulator 120 can be an optical element such as a transmissive liquid crystal panel or a liquid crystal on silicon panel. As indicated in FIG. 1, the spatial light modulator 120 displays two computer-generated holograms A1 and B1 on an LCD panel 122 or a silicon-based LCD panel 122 and modulates at least one of the phase and the amplitude of the incident light beam L to perform diffraction imaging. To achieve an object of angular multiplexing beam splitting, the at least two modulation signals include the diffraction apertures of the two gratings A2 and B2 which respectively adjust the first and second images to different imaging positions at different angles and different distances. The control unit 140 inputs the diffraction apertures of the two gratings A2 and B2 (that is, the modulation signals) to the spatial light modulator 120, and controls the imaging positions of the re-constructed first and second images according to the two gratings A2 and B2, such that the image lights R1 and R2 of the first and second image are respectively projected on the first screen 131 and the second screen 132 of the imaging screen group 130 for the user to view.

The imaging screen group 130 can be formed of transparent screen or reflective screen. If the reflective screen is used, the real parts of the first and second images can be displayed on the reflective screen, which can be a planar mirror or a concave mirror 136. If the transparent screen is used, virtual parts of the first and second images can be generated through the transparent screen and displayed at different imaging positions. In an embodiment, the transparent screen can be a vehicle wind screen 134 or a holographic combiner.

Figure 2:
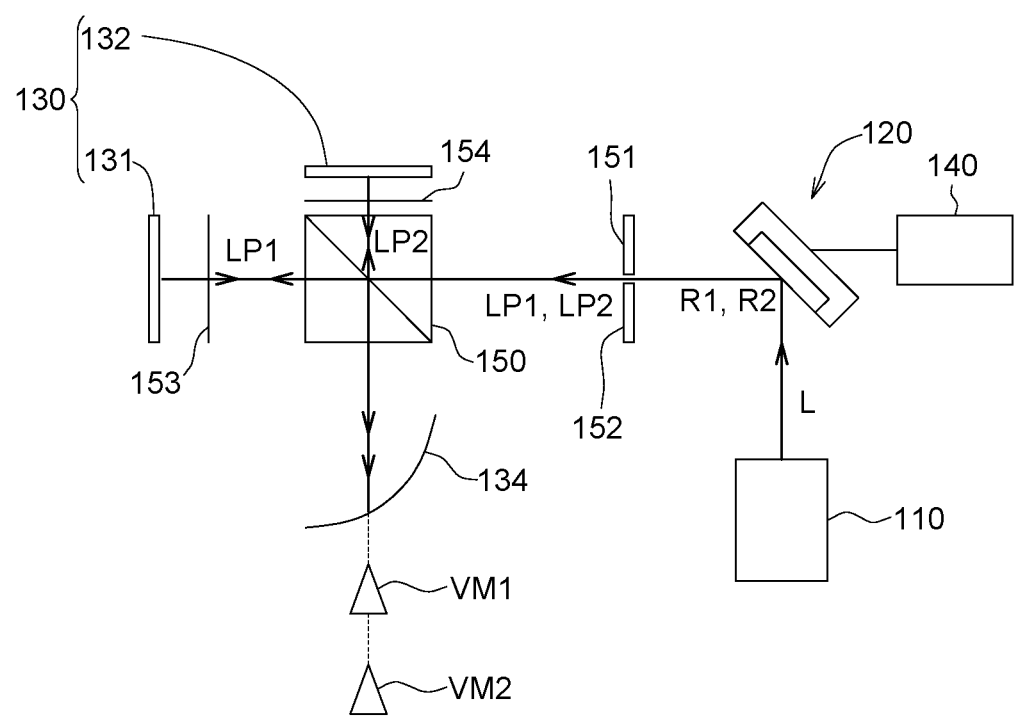
FIG. 2 is a schematic diagram of a head-up display according to another embodiment of the present invention.

Referring to FIG. 2, a schematic diagram of a head-up display 101 according to another embodiment of the present invention is shown. The head-up display 101 includes a light source module 110, a spatial light modulator 120, an imaging screen group 130 and a beam-splitting element 150. The light source module 110 is configured to project a light beam L. The spatial light modulator 120 is configured to modulate the light beam L as a first image and a second image and project respective image lights R1 and R2 of the first and second images. The imaging screen group 130 is configured to reflect the image lights R1 and R2 of the first and second images to the visible range of the user's eye E, such that the user can view the first and second images or respective virtual parts of the first and second images. The beam-splitting element 150 is disposed between the spatial light modulator 120 and the imaging screen group 130 to split the light beam L into a transmitted light beam and a reflective light beam. The transmitted light beam converts to the first image, and the reflective light beam converts to the second image.

As disclosed in above embodiments, the spatial light modulator 120 can be an optical element such as transmissive liquid crystal panel or a liquid crystal on silicon panel. The spatial light modulator 120 displays two computer-generated holograms on an LCD panel or a silicon-based LCD panel and modulates at least one of the phase and the amplitude of the incident light beam L to perform diffraction imaging. The present embodiment is different from the above embodiment in that: the beam-splitting element 150 is configured to split the light beam L into a transmitted light beam and a reflective light beam. The transmitted light beam penetrates the beam-splitting element 150 to generate a first image on the first screen 131, then the image light R1 of the first image is reflected by the beam-splitting element 150 to be projected on the transparent screen such that the virtual part VM1 of the first image is displayed outside the transparent screen. The reflective light beam is reflected by the beam-splitting element 150 to generate a second image on the second screen 132, then the image light R2 of the second image penetrates the beam-splitting element 150 to be projected on the transparent screen such that the virtual part VM2 of the second image is displayed outside the transparent screen. In an embodiment, the transparent screen can be a vehicle wind screen 134 or a holographic combiner.

Moreover, the head-up display 101 further includes at least one of polarization control elements 151 and 152 disposed between the spatial light modulator 120 and the beam-splitting element 150 to change the light beam L as two orthogonal polarized lights LP1 and LP2. The polarization control elements 151 and 152 can be formed by two polarizers or two wave plates 153 and 154. After the two orthogonal polarized lights LP1 and LP2 are split into a transmitted light beam and a reflective light beam by the beam-splitting element 150, the first image on the first screen 131 and the second image on the second screen 132 are combined by the beam-splitting element 150 and then are projected on the transparent screen. Through the polarization multiplexing beam-splitting mechanism, the images outputted by the spatial light modulator 120 can be divided into two orthogonal polarized light fields in the space.

Additionally, the head-up display 101 further includes at least one of wave plates 153 and 154 disposed between the beam-splitting element 150 and the imaging screen group 130 to change the phase retardation of two polarized lights LP1 and LP2. As indicated in FIG. 2, the first wave plate 153 is disposed between the beam-splitting element 150 and the first screen 131, and the second wave plate 154 is disposed between the beam-splitting element 150 and the second screen 132. Through the polarization multiplexing beam-splitting mechanism, the images outputted by the spatial light modulator 120 can be divided into two orthogonal polarized light fields in the space.

The polarization control elements 151 and 152 and the wave plates 153 and 154 disclosed above can be used concurrently or separately, and the quantity of the polarization control elements and the quantity of the wave plates can be one or more than one, and the present embodiment does not have specific restriction regarding the arrangement.

Figure 3:
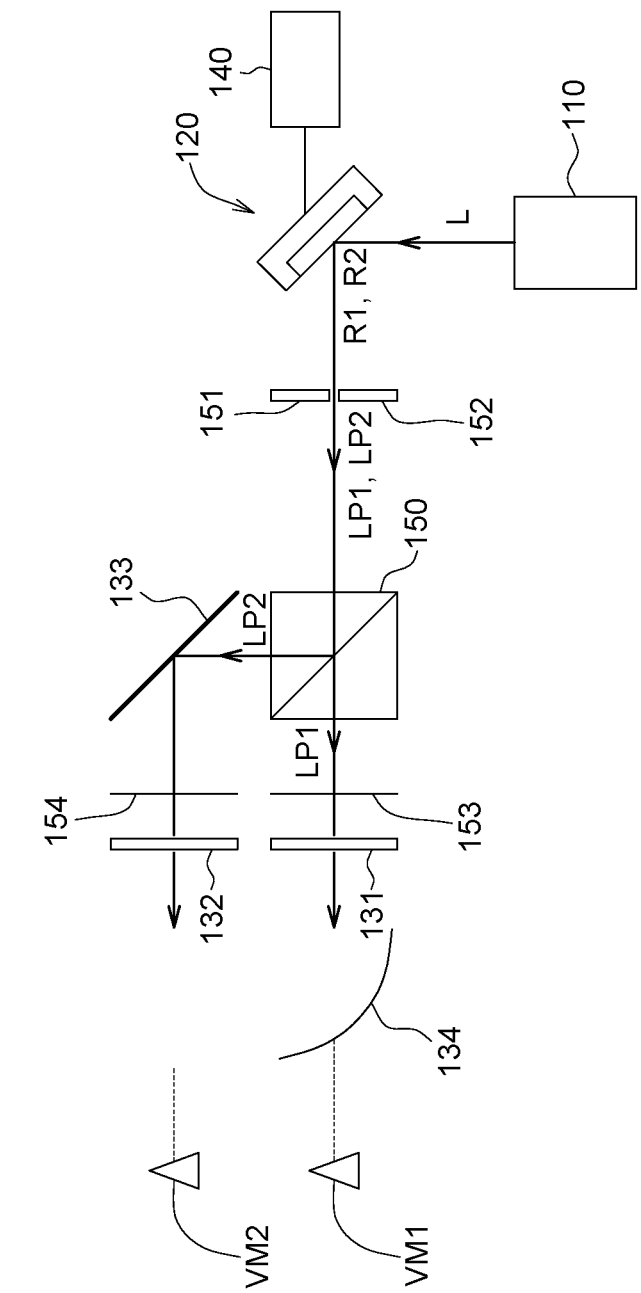
FIG. 3 is a schematic diagram of a head-up display according to an alternate embodiment of the present invention.

Referring to FIG. 3, a schematic diagram of a head-up display 102 according to an alternative embodiment of the present invention is shown. The head-up display 102 of the present embodiment, which adopts a beam-splitting mechanism, is similar to the head-up display 101 of FIG. 2 except that: the transmitted light beam can penetrate the beam-splitting element 150 to generate a first image on the first screen 131, which can be a transparent screen, then a virtual part VM1 of the first image is generated through the first screen 131 and displayed outside the transparent screen (such as the wind screen 134). Also, the reflective light beam can be reflected to an optional reflector 133 by the beam-splitting element 150 to generate a second image on the second screen 132, which can be a transparent screen, then a virtual part of the second image is generated through the second screen 132 and displayed outside the transparent screen (such as the windscreen 134).

As disclosed in above embodiments, the head-up display 102 further includes at least one of polarization control elements 151 and 152 disposed between the spatial light modulator 120 and the beam-splitting element 150 to change the light beam L as two orthogonal polarized lights LP1 and LP2. Besides, the head-up display 100 further includes at least one of wave plates 153 and 154 disposed between the beam-splitting element 150 and the imaging screen group 130 to change the phase retardation of the two polarized lights LP1 and LP2.

The polarization control elements 151 and 152 and the wave plates 153 and 154 disclosed above can be used concurrently or separately, and the quantity of the polarization control elements and the quantity of the wave plate can be one or more than one, and the present embodiment does not have specific restriction regarding the arrangement.

Figure 4:
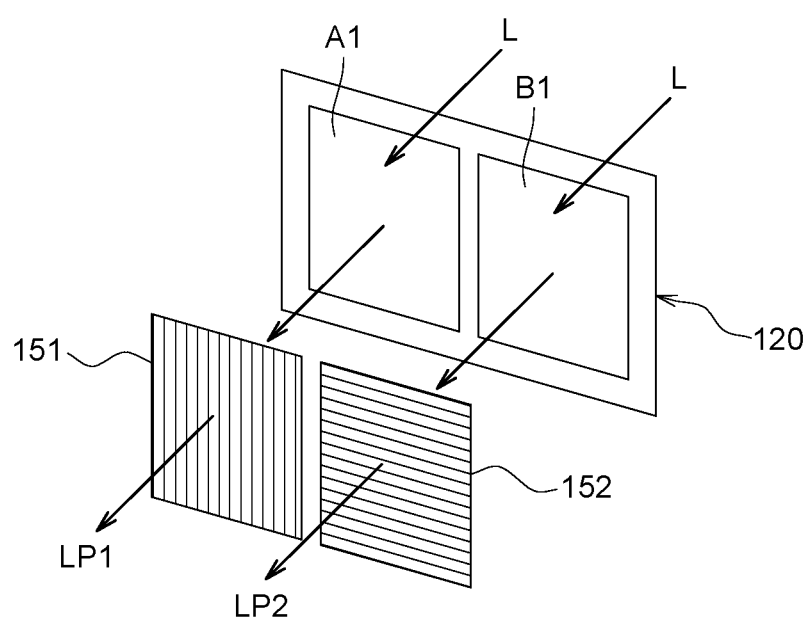
FIG. 4 is a schematic diagram of a light modulator performing polarization beam splitting using polarization control elements according to an embodiment of the present invention.

Referring to FIG. 4, a schematic diagram of a light modulator 120 performing polarization beam splitting using polarization control elements 151 and 152 according to an embodiment of the present invention is shown. In an embodiment, the spatial light modulator 120 is configured to display two computer-generated holograms A1 and B1 on respective display areas. To achieve an object of polarization multiplexing beam splitting, when the spatial light modulator 120 outputs two computer-generated holograms A1 and B1, two polarization control elements 151 and 152 with different polarization states can be disposed in front of the two corresponding computer-generated holograms A1 and B1 respectively. After the incident light beam L passes through the two polarization control elements 151 and 152, the incident light beam L becomes two orthogonal polarized lights LP1 and LP2 to facilitate the subsequent polarization multiplexing light-splitting operation.

The head-up display disclosed in the present invention avoids the imaging problems of the conventional head-up display that requires several image generation modules or needs to adjust the focal length using an adjustable lens. However, the conventional head-up display can display only one image at one distance at one time but cannot display two images at different imaging positions at the same time. Conversely, the head-up display disclosed in the present invention performs multiplexing beam splitting, such as angular multiplexing beam-splitting mechanism or polarization multiplexing beam-splitting mechanism, on one single light beam using a spatial light modulator can concurrently display different images at different imaging positions at different angles and different distances, not only achieving an object of three-dimensional display but also realizing augmented reality.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A head-up display, comprising:
a light source module configured to project a light beam;
a spatial light modulator configured to modulate the light beam as a first image and a second image and project the first and second images;
an imaging screen group configured to reflect the first and second images to a visible range of a user, such that the user can view the first and second images; and
a beam-splitting element disposed between the spatial light modulator and the imaging screen group to split the light beam into a transmitted light beam and a reflective light beam, wherein the transmitted light beam generates the first image, and the reflective light beam generates the second image, wherein the spatial light modulator displays two computer-generated holograms and modulates at least one of a phase and an amplitude of the light beam to perform diffraction imaging, and the spatial light modulator has diffraction apertures of two gratings which respectively adjust the first and second images to two imaging positions with different angles and different distances.

2. The head-up display according to claim 1, wherein the spatial light modulator displays the two computer-generated holograms on one of an LCD panel and a silicon-based LCD panel.

3. The head-up display according to claim 2, wherein the spatial light modulator modulates the light beam using a polarized multiplexing beam-splitting mechanism, such that the first and second images are imaged at two orthogonal imaging positions.

4. The head-up display according to claim 1, further comprising at least one polarization control element disposed between the spatial light modulator and the beam-splitting element to change the light beam as two orthogonal polarized lights.

5. The head-up display according to claim 4, further comprising at least one wave plate disposed between the beam-splitting element and the imaging screen group to change phase retardation of the two orthogonal polarized lights.

* * * * *